(12) United States Patent
Hsu

(10) Patent No.: US 6,310,417 B1
(45) Date of Patent: Oct. 30, 2001

(54) HYBRID-SECONDARY UNCLUTTERED INDUCTION MACHINE

(75) Inventor: John S. Hsu, Oak Ridge, TN (US)

(73) Assignee: Lockheed Martin Energy Research Corporation, Oak Ridge, TN (US)

( * ) Notice: Subject to any disclaimer, the term of this patent is extended or adjusted under 35 U.S.C. 154(b) by 0 days.

(21) Appl. No.: 09/475,591

(22) Filed: Dec. 30, 1999

(51) Int. Cl.[7] .............................. H02K 16/00; H02K 17/16
(52) U.S. Cl. ............................ 310/112; 310/114; 310/256; 318/727; 322/47
(58) Field of Search .................................. 310/112, 114, 310/256; 322/20, 47; 318/727

(56) References Cited

U.S. PATENT DOCUMENTS

| | | | |
|---|---|---|---|
| 3,069,577 | 12/1962 | Lee | 310/166 |
| 3,144,597 | 8/1964 | Lee | 318/220 |
| 3,226,582 | 12/1965 | Beckwith | 310/59 |
| 4,701,691 | * 10/1987 | Nickoladze | 310/112 |
| 4,785,213 | 11/1988 | Satake | 310/116 |
| 4,965,477 | * 10/1990 | Stadler et al. | 310/114 |
| 5,059,876 | 10/1991 | Shah | 318/254 |
| 5,254,894 | * 10/1993 | Satake et al. | 310/114 |
| 5,285,124 | * 2/1994 | Satake et al. | 310/114 |
| 5,594,186 | 1/1997 | Krause et al. | 75/228 |
| 5,838,085 | * 11/1998 | Roesel et al. | 310/113 |
| 5,886,445 | * 3/1999 | Hsu | 310/211 |
| 5,898,287 | 4/1999 | Roberti et al. | 318/605 |

FOREIGN PATENT DOCUMENTS

| | | | |
|---|---|---|---|
| 55053196 | 4/1980 | (JP) | H02P/7/62 |
| 62104491 | 5/1987 | (JP) | H02P/6/02 |

OTHER PUBLICATIONS

Shibashis Bhowmik, et al., "Performance Optimization for Doubly–Fed Wind Power Generation Systems," *IEEE*, 1998 IAS Conference, vol. 3, pp. 2387–2394.

Liao Y.: "Design Of A Brushless Doubly–Fed Induction Motor For Adjustable Speed Drive Applications", Oct. 6, 1996, pp. 850–855, XP000731208.

* cited by examiner

Primary Examiner—Burton S. Mullins
(74) Attorney, Agent, or Firm—Quarles & Brady LLP

(57) ABSTRACT

An uncluttered secondary induction machine (100) includes an uncluttered rotating transformer (66) which is mounted on the same shaft as the rotor (73) of the induction machine. Current in the rotor (73) is electrically connected to current in the rotor winding (67) of the transformer, which is not electrically connected to, but is magnetically coupled to, a stator secondary winding (40). The stator secondary winding (40) is alternately connected to an effective resistance (41), an AC source inverter (42) or a magnetic switch (43) to provide a cost effective slip-energy-controlled, adjustable speed, induction motor that operates over a wide speed range from below synchronous speed to above synchronous speed based on the AC line frequency fed to the stator.

12 Claims, 3 Drawing Sheets

HYBRID-SECONDARY UNCLUTTERED INDUCTION MACHINE

This invention was made with Government support under Contract No. DE-AC05-96OR22464 awarded by the U.S. Department of Energy. The Government has certain rights in the invention.

DESCRIPTION OF THE BACKGROUND ART

There is an existing type of induction motor known as a brushless doubly fed induction motor (BDFIM), which has two sets of stator windings for operation with two p-poles and two q-poles. The rotor winding has a two-pole (p+q) nested cage. The existing extended rotor cage technology has drawbacks associated with a type of energy transfer known as cluttered energy transfer. It utilizes a drive with a relatively narrow speed range and not insignificant energy losses.

There is a need for a lower than synchronous speed drive having a wider speed range. To provide such a drive, it is necessary to control the power which is related to the slip of the rotor at speeds lower or higher than the speed of the stator rotating field. This would reduce energy loss and lower the cost for adjustable speed motor drives and power generation.

SUMMARY OF THE INVENTION

The invention relates to a new hybrid-secondary uncluttered induction machine. The hybrid secondary can be switched between an effective resistance, a source of DC bias voltage or an AC source of variable frequency. The rotor current is magnetically coupled to the stator through an uncluttered rotating transformer.

This machine of the present invention can be used as a cost effective, slip-energy-controlled, adjustable speed induction motor that operates below synchronous speed. This machine may take the form of either a motor or a generator having a wide speed range of operation which extends both above and below the synchronous speed of the stator rotating field.

The uncluttered coupling of the rotating transformer allows the slip energy to be transferred without an excessive reduction in torque.

Magnetic saturation is utilized at extremely low slip frequency for a full-load operation. The power required for magnetic saturation is low.

The slip energy control power is relatively small when compared with the full load rating of the motor.

A motor according to the present invention has a potential to be fed from both the stator of the induction motor and the stator of the rotating transformer for higher than synchronous speed operation. It also has a potential to be used for a wide-speed-range induction generator.

Other objects and advantages of the invention, besides those discussed above, will be apparent to those of ordinary skill in the art from the description of the preferred embodiment which follows. In the description, reference is made to the accompanying drawings, which form a part hereof, and which illustrate examples of the invention. Such examples, however, are not exhaustive of the various embodiments of the invention, and therefore, reference is made to the claims which follow the description for determining the scope of the invention.

DETAILED DESCRIPTION OF THE INVENTION

An induction machine is normally viewed from its physical nature as a transformer with its stator as the primary and its rotor as the secondary of the transformer. The present invention is related to the secondary portion of this circuit.

It is generally agreed that major energy savings in electric motor drives is achieved with adjustable speed drives. The higher cost of adjustable speed drives discourages many potential users. There are many known control methods for adjustable speed control. For instance, the brushless doubly-fed motor (BDFM) is a good example of a method for lowering the initial cost of adjustable speed control and power generation, but has its drawbacks. The present invention introduces a new induction machine that has a significant potential to lower the cost of adjustable speed drives, while providing a wide range of speed control that extends both above and below synchronous speed.

The speed range and the load torque required over that speed range determine the rating of the slip power controller of an induction motor. Fan loads and pump loads represent two-thirds of the applications for motor drives in industry. As expressed in equation 1) below, for a fan load without back pressure, the required fan power is proportional to the cube of the rotor speed. For a fan load with a certain back pressure, the required fan power is proportional to the square of the rotor speed. Assuming unity efficiency and power factor, the per-unit slip for these two examples may be roughly given as follows:

$$\text{(Per unit slip energy)} \approx \text{slip} \cdot (1-\text{slip})^{3 \text{ or } 2} \qquad (1)$$

TABLE 1

Examples of Per-unit Slip Powers of Fan Loads

| Based on stator rotating field slip | Per unit slip power | |
|---|---|---|
| | W/o back pressure $\text{slip} \cdot (1-\text{slip})^3$ | With back pressure $\text{slip} \cdot (1-\text{slip})^2$ |
| −0.2 | −0.346 | −0.288 |
| −0.1 | −0.133 | −0.121 |
| 0 | 0 | 0 |
| 0.01 | 0.0097 | 0.0098 |
| 0.1 | 0.0729 | 0.081 |
| 0.3 | 0.1029 | 0.147 |
| 0.5 | 0.0625 | 0.125 |
| 0.7 | 0.0189 | 0.063 |
| 0.9 | 0.0009 | 0.009 |
| 1.0 | 0 | 0 |

Table 1 shows that the rating of the positive slip power of a fan load is generally low for speeds below synchronism corresponding to the stator rotating field. Consequently, even with the consideration of the non-unity power factor and efficiency, the power rating necessary for the control of speed is low. This enables the use of a very small power electronics module or an adjustable resistor to control a motor of high power rating. This energy absorption approach may be referred to as an "effective resistance" approach.

In addition to the speed control below synchronous speed, this invention will disclose the methods to operate the machine above synchronous speed.

In order to control the rotor slip energy of an induction motor that has no slip rings, the rotor current must be coupled to a stationary control circuit through a rotating transformer.

Figure 1:
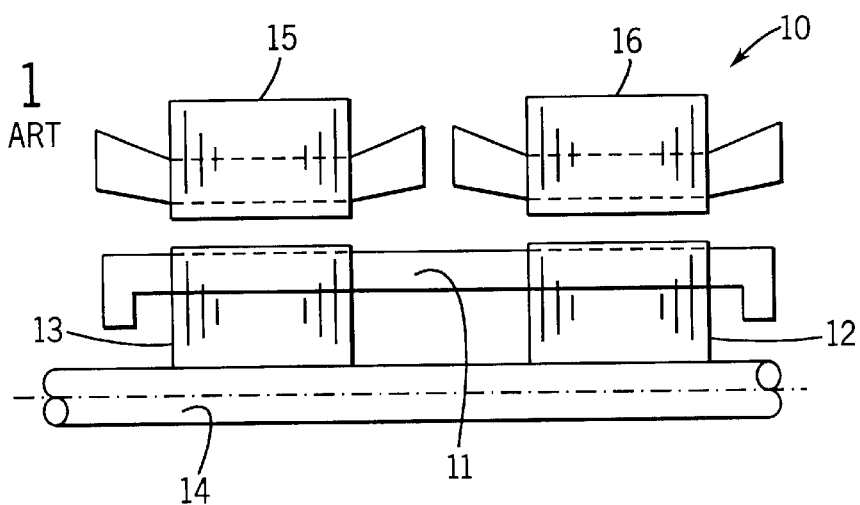
FIG. 1 is a schematic diagram of an induction motor of the prior art which utilized cluttered coupling.

A rotating transformer that couples to the rotor bar currents in a conventional rotor and stator arrangement is known in the art. A typical arrangement is shown in FIG. 1. The secondary circuit of an induction machine 10 can be provided by adding an additional rotor core 13 that accommodates the extension of the rotor winding or bars 11 for an original rotor core 12. Both rotor cores 12, 13 are carried by a rotating shaft 14. The additional rotor core 13 is coupled to an additional stator core 15 that is magnetically uncoupled to the original stator core 16. The additional rotor and stator cores 13, 15 are magnetically coupled.

Unfortunately, a rotating transformer that transfers the rotor bar currents to the stator 16 through an additional rotor and stator 13, 15 as shown in FIG. 1 is a "cluttered" coupling device. The two different energies associated with the rotor current frequency and the rotation, respectively, are transformed together between the additional stator 15 and rotor 13. The rotation energy is not desired for speed control, because it produces a torque that weakens the shaft torque. Therefore, a critical requirement for the rotating transformer is that only the slip energy excluding the rotor rotation energy should be transmitted to the stationary control circuit. Therefore, a unique "uncluttered" coupling technology for power (not a weak signal) transfer is introduced in this invention.

Figure 2:
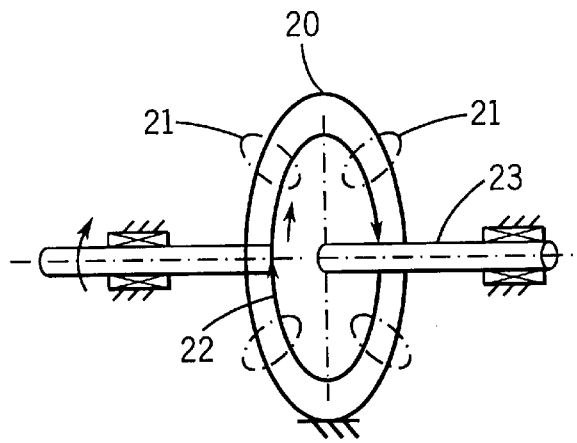
FIG. 2 is a schematic diagram of a motor of the present invention which utilizes uncluttered coupling between stator coils and rotor coils.

FIG. 2 shows a peripherally wound stator coil 20 that carries a magnetic flux 21. A peripherally wound rotor coil 22 rotates with shaft 23 and carries a slip-frequency current. Because the rotation does not change the total magnetic flux linking both the rotor coil 22 and stator coil 20, no electromotive force (emf) is induced in the stator coil due to the rotation of the rotor coil 22.

Due to the lack of influence by the rotation of the rotor, the slip-frequency current of the rotor 22 will change the flux coupling and induce an emf in the stator coil regardless of the speed of the rotor. This "uncluttered" coupling allows only the slip energy power corresponding to the slip frequency currents to be transferred between the rotor coils and the stator coils.

Figure 3:
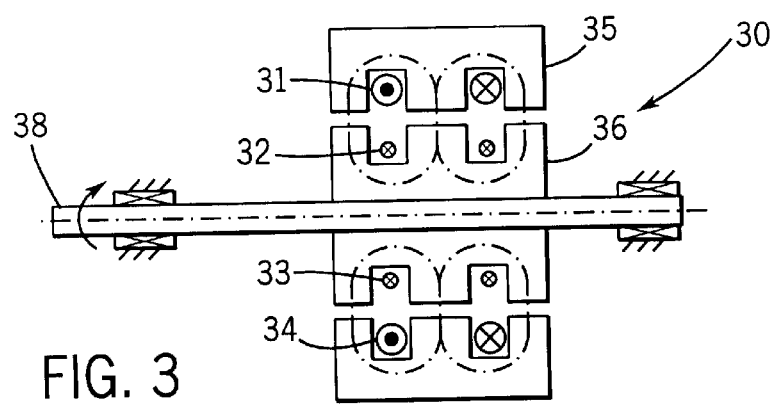
FIG. 3 is a mechanical schematic diagram of a 2-phase rotating transformer that uses uncluttered coupling according to the present invention.

FIG. 3 shows an example of a two-phase rotating transformer 30 with an uncluttered arrangement to transfer energy between the rotor and stator. Coils 31, 32, 33 and 34 are wound peripherally in both the stator core 35 and rotor core 36. Magnetically saturable cores 35, 36 are used, as explained more fully below. The rotor core 36 rotates with shaft 38.

As used herein, the term "hybrid secondary" means that several secondary circuits can be used in various combinations for different applications. The induction machine of the present invention is associated with an effective variable resistance circuit, an inverter circuit for double-feed operation, and a magnetic switch circuit.

Figure 6:
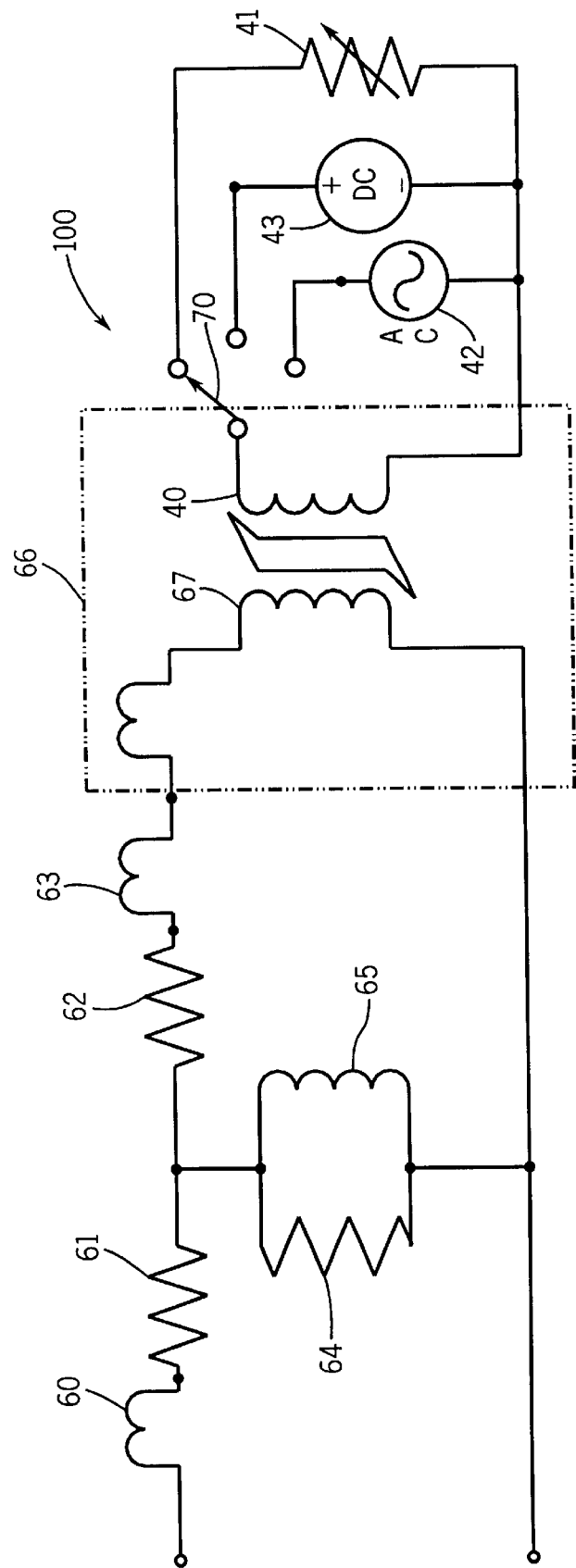
FIG. 6 is an electrical schematic diagram illustrating a preferred embodiment of the present invention.

Referring to FIG. 6, a hybrid secondary 40 of the present invention can be connected to a variable resistance 41 that absorbs the slip energy or to an energy recovery circuit that feeds the slip energy back to the power supply. Either approach is equivalent to connecting a variable resistance 41 to the secondary circuit of the induction machine.

The capability of transferring energy that is not affected by the rotation of the transformer also provides an opportunity to feed the rotor with an AC source 42 of adjustable frequency. The rotor speed and slip are defined according to the combination of both rotating fields generated by the rotor current and the stator current. The following relationship among angular velocities always holds true.

$$\omega_{rotor} + \omega_{rotor\ current} = \omega_{stator\ current} \tag{2}$$

where $\omega_{rotor}$ is the rotor angular velocity; $\omega_{rotor\ current}$ is a signed rotating field velocity generated by the rotor current (a positive sign means that the field rotates in the same direction as the rotor velocity); and $\omega_{stator\ current}$ is a signed rotating field generated by the stator current with the same definition for sign.

When only the stator is fed and the rotor speed is approaching synchronism, the slip frequency is close to zero. At a low frequency without feeding the rotor with a separate higher frequency supply, the power transfer capability of a rotating transformer is extremely low. In order to overcome this problem, a DC current can be introduced to the stator coils of the rotating transformer.

Figure 4A:
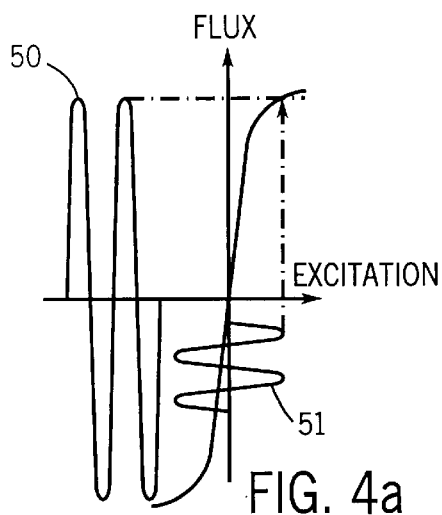
FIGS. 4a and 4b are graphs of AC excitation without DC bias current and with DC bias current, respectively.
Figure 4B:
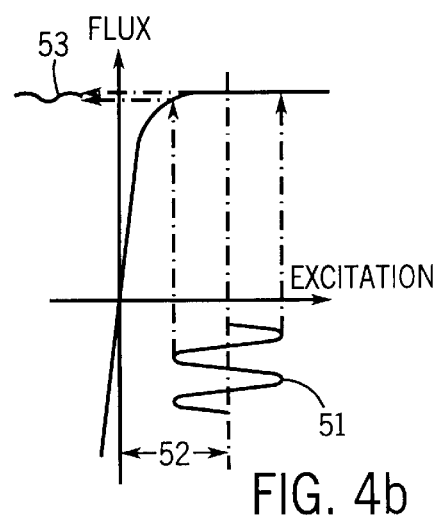
Figure 5:
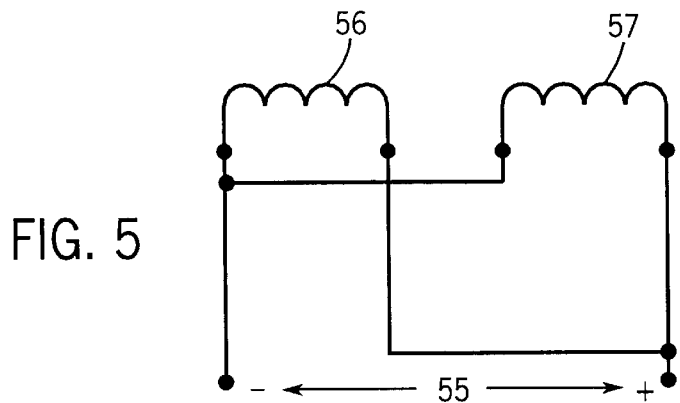
FIG. 5 is a schematic of a DC bias circuit for supplying the DC bias current of FIG. 4.

FIGS. 4a and 4b illustrate that a DC current may saturate flux in the magnetic core of the rotating transformer. In FIG. 4a, where there is no DC bias current, the flux 50 produced by the rotor AC current 51 in the core of the transformer is very high. FIG. 4b shows that with a DC bias current 52 the alternating flux 53 produced by the same AC current 51 is negligible. Consequently, the rotor current sees small mutual and self-inductances of the rotating transformer. This enables the induction motor to run as a conventional induction motor without a significant influence from the rotating transformer. Since the transformer has a peripheral coupling, the DC flux produced by the DC bias current would not produce a braking torque. The power required to saturate the core is low, because the stator coils have low resistances and the DC voltage drop across the coils is very low. An example of a DC bias circuit is shown in FIG. 5, where a DC supply 55 is connected across two stator coils 56, 57.

FIG. 6 shows an adjustable speed induction machine 100 which is controlled by controlling slip energy by applying a source of DC bias current 43 to the secondary 40. The left-hand side of the circuit is a typical induction motor circuit with the stator, rotor, and magnetization impedances 60–65. A saturable uncluttered rotating transformer 66 magnetically links a rotor primary winding 67 to a secondary winding 40 in the uncoupled stator. A switch 70 is used to switch between a variable equivalent resistance 41 that may convert the energy back to the system, or to AC variable frequency source 42 or a DC power source 43 with a very low voltage that may saturate the core of the rotating transformer. The ratings of the variable equivalent resistance 41 and the DC power source 43 are substantially lower than the rating of the motor at full load. Therefore, conversion of the slip energy that may otherwise be consumed through the variable resistance 41 back to the power supply does not affect the efficiency of the machine 10 that much. The major energy saving comes from the lower power input to the machine 10 at low speed.

Figure 7:
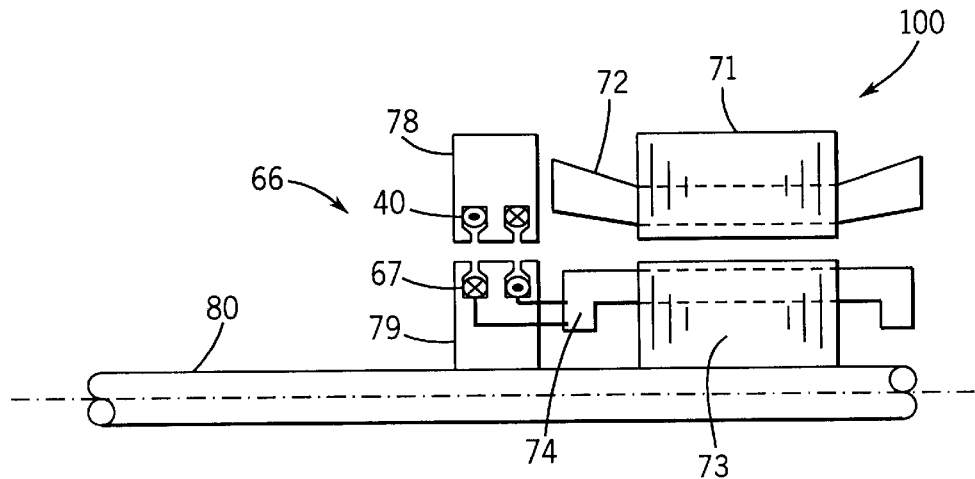
FIG. 7 is a mechanical schematic diagram of a 4-pole machine according to the present invention.

FIG. 7 shows half of the side-view of a 4-pole, 10-hp prototype of an uncluttered secondary machine 100 of the present invention. A stator core 71 on the right-hand side of the drawing is wound with a polyphase winding 72. In this machine the stator 71 has a three-phase winding. A rotor core 73 is wound with two-phase winding 74. Besides a winding, one or more conductors of cast aluminum can also be used on a rotor. The number of phases can be different between the rotor 73 and the stator 71. The reason for having a two-phase rotor 73 is to have a two-phase uncluttered rotating transformer 66 that is shown in the left-hand side of the drawing. The rotor winding of the induction motor 74 is connected to the rotor coils 67 of the two-phase uncluttered rotating transformer 75. The stator coils 40 of the rotating transformer 66 do not connect to the stator winding 72, but are magnetically coupled to the rotor coils 67. The cores 78, 79 of the rotating transformer 66 can be made of pressed powder. However, in order to save the expense of pressed powder, solid steel cores with slits can be used for the stator and rotors of the rotating transformer 66 to reduce the core loss.

Initial tests indicate that it is feasible to combine the effective resistance and the DC bias circuits for the speed control below synchronous speed. No rotation energy is transferred by the uncluttered rotating transformer 66. The slip energy that is required to be transferred is generally low. The DC power required for the DC bias is also relatively low.

The induction machine of the present invention can run at a speed above synchronous speed of the stator rotating field, when the stator 78 of the uncluttered rotating transformer 66 is fed by an AC source of adjustable frequency 42.

This has been a description of the preferred embodiments of the method and apparatus of the present invention. Those of ordinary skill in this art will recognize that modifications might be made while still coming within the spirit and scope of the invention and, therefore, to define the embodiments of the invention, the following claims are made.

I claim:

1. An uncluttered electrical machine comprising:
   a first stator having at least one winding disposed thereon, said stator having a cylindrical portion defining a central axis for the machine;
   a first rotor having at least one current-carrying conductor disposed thereon for rotation about the central axis of the machine;
   a transformer having a second rotor mounted for rotation around the central axis with the first rotor, wherein the second rotor is electrically connected to the current-carrying conductor in the first rotor, the transformer also having a second stator mounted adjacent the first stator, wherein the second stator and the second rotor each have conductors disposed in a peripheral direction around the central axis, so as to couple only slip-frequency flux and not rotor rotational flux, and further comprising a device which is electrically connected to the second stator to control current in said second stator, which further controls slip-frequency flux in the second rotor, and which further controls slip-frequency current in the first rotor which is electrically connected to the second rotor.

2. The machine of claim 1, wherein the device for controlling current in the second stator is a variable resistance.

3. The machine of claim 2, wherein the variable resistance is effective for control in a speed range below synchronous speed for the machine.

4. The machine of claim 1, wherein the device for controlling current in the second stator is a source of DC bias current.

5. The machine of claim 4, wherein the device for controlling current in the second stator also includes a variable resistance which is effective for control in a speed range below synchronous speed for the machine.

6. The machine of claim 1, wherein the device for controlling current in the second stator is an AC source of variable frequency.

7. The machine of claim 6, wherein the device for controlling current in the second stator also includes a variable resistance which is effective for control in a speed range below synchronous speed for the machine.

8. The machine of claim 1, 2, 3, 4, 5, 6 or 7, wherein the device for controlling current in the second stator is switched into and out of electrical connection with th e second stator.

9. The machine of claim 1, wherein the machine is a motor.

10. The machine of claim 1, wherein the machine is a generator.

11. The machine of claim 1, wherein the first rotor and the second rotor include at least one rotor winding.

12. The machine of claim 1, wherein the first rotor and the second rotor include at least one conductor formed by a metal casting.

* * * * *